(12) United States Patent
Kim

(10) Patent No.: US 7,196,992 B2
(45) Date of Patent: Mar. 27, 2007

(54) APPARATUS AND METHOD FOR REPRODUCING RECORDED DATA ON READ-ONLY RECORDING MEDIUM

(75) Inventor: Jin Yong Kim, Kyunggi-do (KR)

(73) Assignee: LG Electronics Inc. (KR)

( * ) Notice: Subject to any disclaimer, the term of this patent is extended or adjusted under 35 U.S.C. 154(b) by 0 days.

(21) Appl. No.: 10/893,033

(22) Filed: Jul. 16, 2004

(65) Prior Publication Data

US 2004/0257945 A1 Dec. 23, 2004

Related U.S. Application Data

(62) Division of application No. 10/092,703, filed on Mar. 5, 2002.

(30) Foreign Application Priority Data

Mar. 9, 2001 (KR) .................................. 01-12149

(51) Int. Cl.
  *G11B 5/09* (2006.01)
  *G11B 7/24* (2006.01)
(52) U.S. Cl. ................... 369/53.2; 369/47.21
(58) Field of Classification Search ............ None
  See application file for complete search history.

(56) References Cited

U.S. PATENT DOCUMENTS

| 5,587,978 A | * | 12/1996 | Endo et al. ............ 369/124.01 |
| 5,644,507 A | | 7/1997 | Ostrover et al. |
| 5,729,516 A | * | 3/1998 | Tozaki et al. ............ 369/53.21 |
| 6,115,340 A | | 9/2000 | Van Den Enden et al. |
| 6,330,392 B1 | * | 12/2001 | Nakatani et al. ............. 386/52 |
| 6,477,123 B1 | * | 11/2002 | Hutter ..................... 369/47.32 |
| 2002/0051631 A1 | | 5/2002 | Okamoto et al. |

FOREIGN PATENT DOCUMENTS

| EP | 1 045 391 A1 | 10/2000 |
| JP | 63161569 | 7/1988 |
| JP | 2002050136 | 2/2002 |
| WO | WO 00/31737 | 6/2000 |
| WO | WO 01/15168 A1 | 3/2001 |

\* cited by examiner

*Primary Examiner*—Andrea Wellington
*Assistant Examiner*—Peter Vincent Agustin
(74) *Attorney, Agent, or Firm*—Lee, Hong, Degerman, Kang & Schmadeka

(57) ABSTRACT

A read-only recording medium and a reproducing method thereof ensures reproduction compatibility with a rewritable recording medium in which real data is recorded with substantial discontinuity. The read-only recording medium comprises a data recording area in which real data is stored; and a plurality of waste areas allocated at intervals in the data recording area. The method of reproducing data stored in a read-only recording medium reproduces data from the read-only recording medium, skips if a waste area is encountered or removes invalid data reproduced from the waste area wherein each waste area has been inserted periodically in the read-only recording medium, and outputs the data reproduced before and behind each waste area in succession. As a result, the playability is improved in a disk device capable of reproducing both a read-only and a rewritable recording medium.

11 Claims, 3 Drawing Sheets

*Conventional Art*

US 7,196,992 B2

APPARATUS AND METHOD FOR REPRODUCING RECORDED DATA ON READ-ONLY RECORDING MEDIUM

CROSS REFERENCE TO RELATED ART

This application is a division of U.S. application Ser. No. 10/092,703, filed Mar. 5, 2002, which claims the benefit of Korean Patent Application No. 2001-12149, filed on Mar. 9, 2001, which is hereby incorporated by reference in its entirety.

BACKGROUND OF THE INVENTION

1. Field of the Invention

The present invention relates to a read-only recording medium and a reproducing method thereof. A read-only recording medium in accordance with the present invention ensures reproduction compatibility with a rewritable recording medium in which real-time data such as moving-picture and audio data is recorded with substantial discontinuity.

2. Description of the Related Art

A disk of large storage capacity, called 'DVD', which has been developed to store high-quality moving pictures for longer time than a compact disk (generically called 'CD'), is expected to be widely used. The DVD has three types, 'read-only' such as a DVD-ROM, 'write-once' such as a DVD-R, and 'rewritable' such as DVD-RAM or DVD-RW.

The read-only type, namely, the DVD-ROM which is being widely used at present is a high-density recording medium an is 4.7 Gbytes in storage capacity. This capacity is about eight times as large as a conventional CD. The DVD-ROM has two recording areas for user data and management information. A real-time data, such as high-quality moving-picture data or audio data, has been recorded seamlessly in the data recording area, and management information such as navigation data for reproduction control of recorded real-time data has been recorded in the management information recording area.

FIG. 1 is a hierarchical structure of real-time data recorded in the data recording area of a DVD-ROM. The recorded real-time data shall be constructed with at least one video object (VOB) which is a data collection corresponding to a video title or chapter. The VOB shall consist of a plurality of video object units (VOBUs). Each VOBU shall consist of two ECC blocks each of which shall consist of 16 sectors. Because the size of a sector is 2048 Bytes the ECC block is about 32 Kbytes in size.

A disk device, such as a DVD player or a DVD drive, capable of reproducing a DVD-ROM reads the management information for recorded data from the management information recording area first, and then reproduces the real-time data structured as FIG. 1 from the data recording area with reference to the read management information. Because the real-time data has been recorded continuously, a seamless reproduction can be accomplished only if the real-time data is outputted in the order of reproduction without any special data manipulation.

In the meantime, the concrete standard for a rewritable DVD, such as a DVD-RAM or a DVD-RW, is under development. Such a rewritable DVD has the same storage capacity of 4.7 Gbytes as the read-only DVD-ROM.

Thus, if such a rewritable DVD is commercially and commonly used as a data storage means, a user can record desired digital television broadcast programs for a long time or copy real-time data stored in a DVD-ROM onto a DVD-RAM or a DVD-RW through a disk device like a DVD recorder.

As explained above, the real-time data has been stored seamlessly in a DVD-ROM. However, the real-time data is recorded discontinuously in the rewritable DVD because an area for header information or linking loss is allocated intermittently among real-time data.

FIG. 2 shows a data structure recorded discontinuously in a rewritable DVD-RW. As shown in FIG. 2, RMA (Recording Management Area) except RMA Lead-in is constructed with 5 RMA segments. Each RMA segment consists of 28 RMD (Recording Management Data) sets. Each RMD set consists of a plurality of 32-Kbyte RMD blocks each of which is constructed with 15 data fields and a linking loss area of 2 Kbytes in which valid real-time data is not to be written. Because a linking loss area is inserted at the head of every RMD block the data recorded in the DVD-RW is in discontinuous recording state.

Usually a linking loss area is provided for sufficient buffering for facilitating fully random write or overwrite.

Because of the linking loss area or the header information area in which valid data shall not be written, the substantial storage capacity of a DVD-RAM or DVD-RW is correspondingly reduced from the nominal capacity of 4.7 Gbytes. Thus, the entire data stored in a DVD-ROM can not be copied onto a DVD-RAM or a DVD-RW.

When a DVD-ROM is placed in a disk device, such as a DVD player or a disk drive, the disk device can reproduce real-time data stored in a DVD-ROM seamlessly by simply outputting data read from a DVD-ROM in reading order without any special manipulation. However, if a rewritable DVD-RW or DVD-RAM which data has been discontinuously recorded onto is placed in, a disk device must conduct a special operation to accomplish seamless reproduction, namely, it temporarily stores all data read from the rewritable disk, deletes data read from the header information or the linking loss area, and outputs real data before and behind the header information or the linking loss area. Accordingly, a disk device must be equipped with different reproduction algorithms which are selectively used based on the type of a placed disk.

SUMMARY OF THE INVENTION

It is an object of the present invention to provide a read-only recording medium in which real-time data such as moving-picture or audio data has been stored discontinuously by inserting waste areas at intervals among the stored real-time data in order to ensure reproduction compatibility with a rewritable recording medium such as a DVD-RAM or a DVD-RW and to make the storage capacity of a read-only recording medium equal to that of a rewritable recording medium.

It is another object of the present invention to provide a ROM medium compatible with a future RAM medium in data reproduction.

It is another object to provide a method of seamlessly reproducing data stored in a read-only recording medium where waste areas are allocated at intervals among the stored real-time data in accordance with the present invention.

A read-only recording medium in accordance with the present invention is characterized in that it comprises a data recording area in which real data is stored; and a plurality of waste areas allocated at intervals in the data recording area.

A method of reproducing data stored in a read-only recording medium in accordance with the present invention is characterized in that it comprises the steps of: reproducing data from the read-only recording medium; skipping if a waste area is encountered or removing invalid data reproduced from the waste area wherein each waste area has been inserted periodically in the read-only recording medium; and outputting the reproduced data before and behind each waste area in succession.

The present invention may be embodied in other specific forms without departing from the sprit or essential characteristics thereof. The present embodiments are therefore to be considered in all respects as illustrative and not restrictive, the scope of the invention being indicated by the appended claims rather than by the following description and all changes which come within the meaning and range of equivalency of the claims are therefore intended to be embraced therein.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein:

FIG. 4 is a simplified block diagram of a disk device which a reproducing method for a read-only recording medium according to the present invention is embedded in.

DETAILED DESCRIPTION OF THE PREFERRED EMBODIMENT

In order that the invention may be fully understood, a preferred embodiment thereof will now be described with reference to the accompanying drawings.

Figure 1:
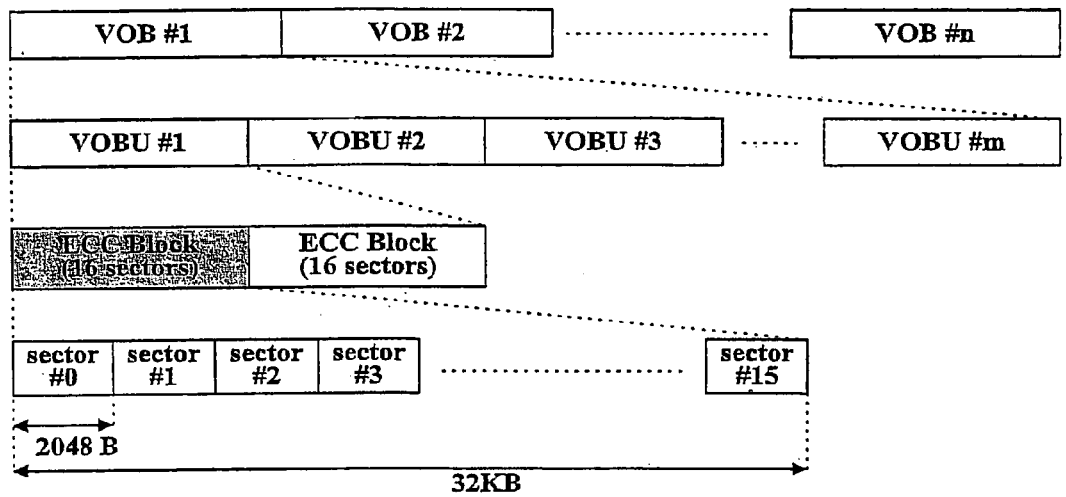
FIG. 1 is a conventional hierarchical structure of real-time data stored in a DVD-ROM.
Figure 2:
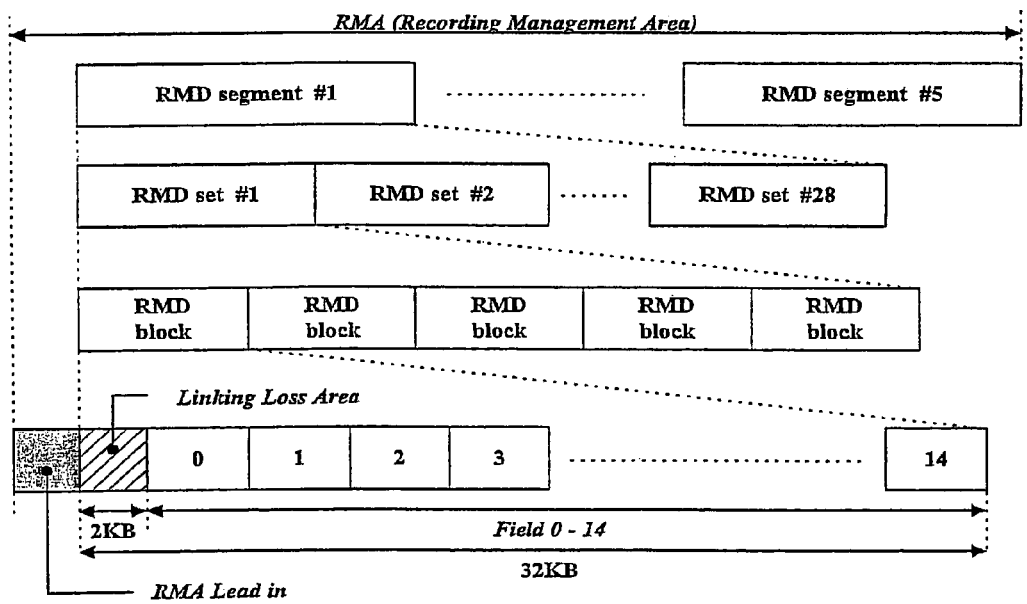
FIG. 2 shows a data structure recorded discontinuously in a rewritable DVD-RW.
Figure 3:
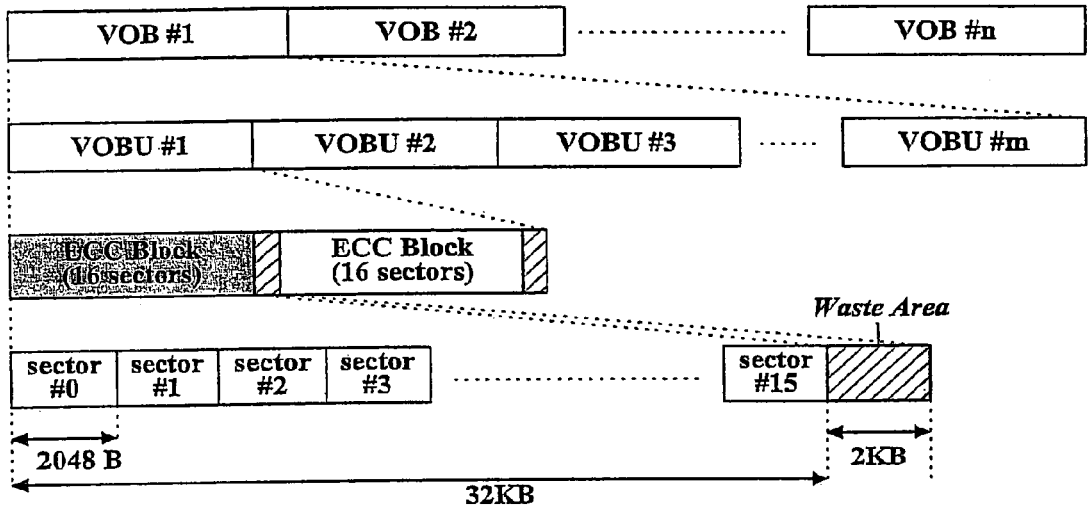
FIG. 3 is an illustrative structure of data constructed onto a read-only recording medium manufactured in accordance with the present invention.

FIG. 3 is an illustrative structure of data constructed onto a read-only recording medium in accordance with an embodiment of the present invention. The same as the data structure of FIG. 1, the real-time data of FIG. 3 is constructed with at least one VOB which is a data collection corresponding to a video title or chapter, the VOB consists of a plurality of VOBUs, and the VOBU consists of two ECC blocks each of which consists of 16 sectors. However, a waste area of 2 Kbytes is allocated every 16 sectors, namely, one ECC block in the embodiment of FIG. 3 in accordance with the present invention.

In a preferred embodiment, even though a waste block is appended to a tail of one ECC block in the embodiment of FIG. 3, it may be inserted in the head of each ECC block.

The waste area is corresponding to the header information area allocated at intervals among recorded data in a DVD-RAM and to the linking loss area placed every RMD block in a DVD-RW.

The waste area may have a different size other than 2048 bytes in accordance with the size of the header information area defined in a DVD-RAM or the linking loss area defined in a DVD-RW. If the size of a recording unit, e.g., a sector defined in a disk is smaller than 2048 bytes, the size of the waste area can be also smaller than 2048 bytes.

The storage capacity of a DVD-ROM, with a nominal storage capacity of 4.7 Gbytes, is correspondingly reduced by the total size of inserted waste areas. This size reduction makes the substantial storage capacity of a DVD-ROM equal to or less than that of a DVD-RAM and a DVD-RW which have the header information areas and the linking loss areas, respectively. Thus, the entire real-time data stored in a DVD-ROM, in which the waste areas are allocated at intervals, can be copied onto a DVD-RAM or a DVD-RW.

Described below is a method of seamlessly reproducing the present read-only recording medium in which a waste area is inserted in every data unit such as ECC block as explained above.

Figure 4:
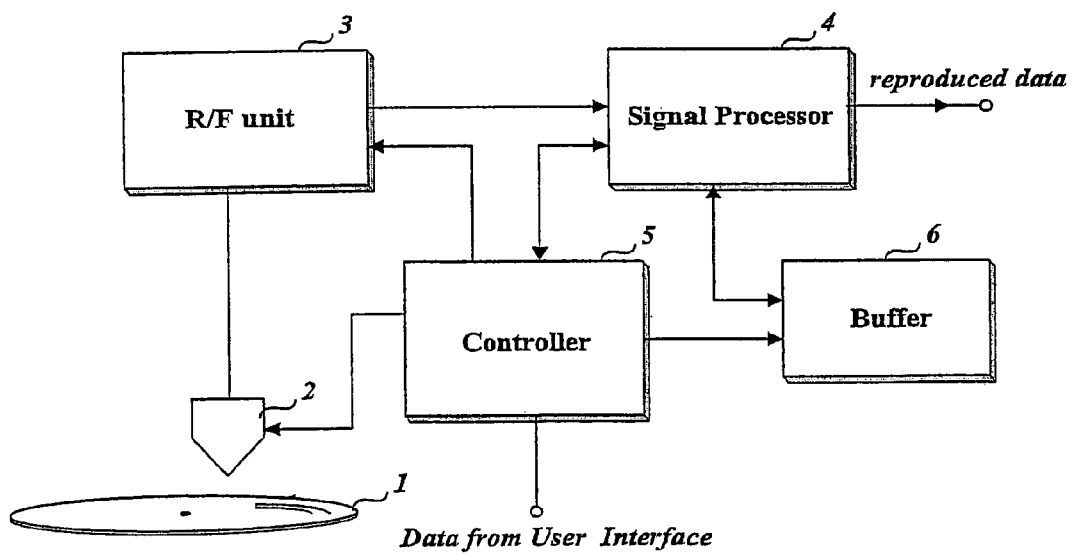

FIG. 4 is a simplified block diagram of a disk device which a reproducing method for a read-only recording medium according to the present invention is incorporated therein. The disk device of FIG. 4, which may be a DVD player or a DVD drive, comprises an optical pickup 2 detecting signal patterns formed in a DVD-ROM 1; an R/F unit 3 converting the detected signal patterns to binary waveforms; a signal processor 4 processing the binary waveforms from the R/F unit 3 to restore original digital data; a controller 5 controlling all elements for reproduction of the DVD-ROM 1; and a buffer 6 storing temporary data produced while reproducing the DVD-ROM 1.

If the waste area is encountered while reproducing the data of the DVD-ROM 1 in the recorded order, the controller 5 removes the invalid data from the encountered waste area and connects the data reproduced before and behind the waste area to seamlessly output reproduced data. This reproducing method is explained below in detail.

Figure 5:
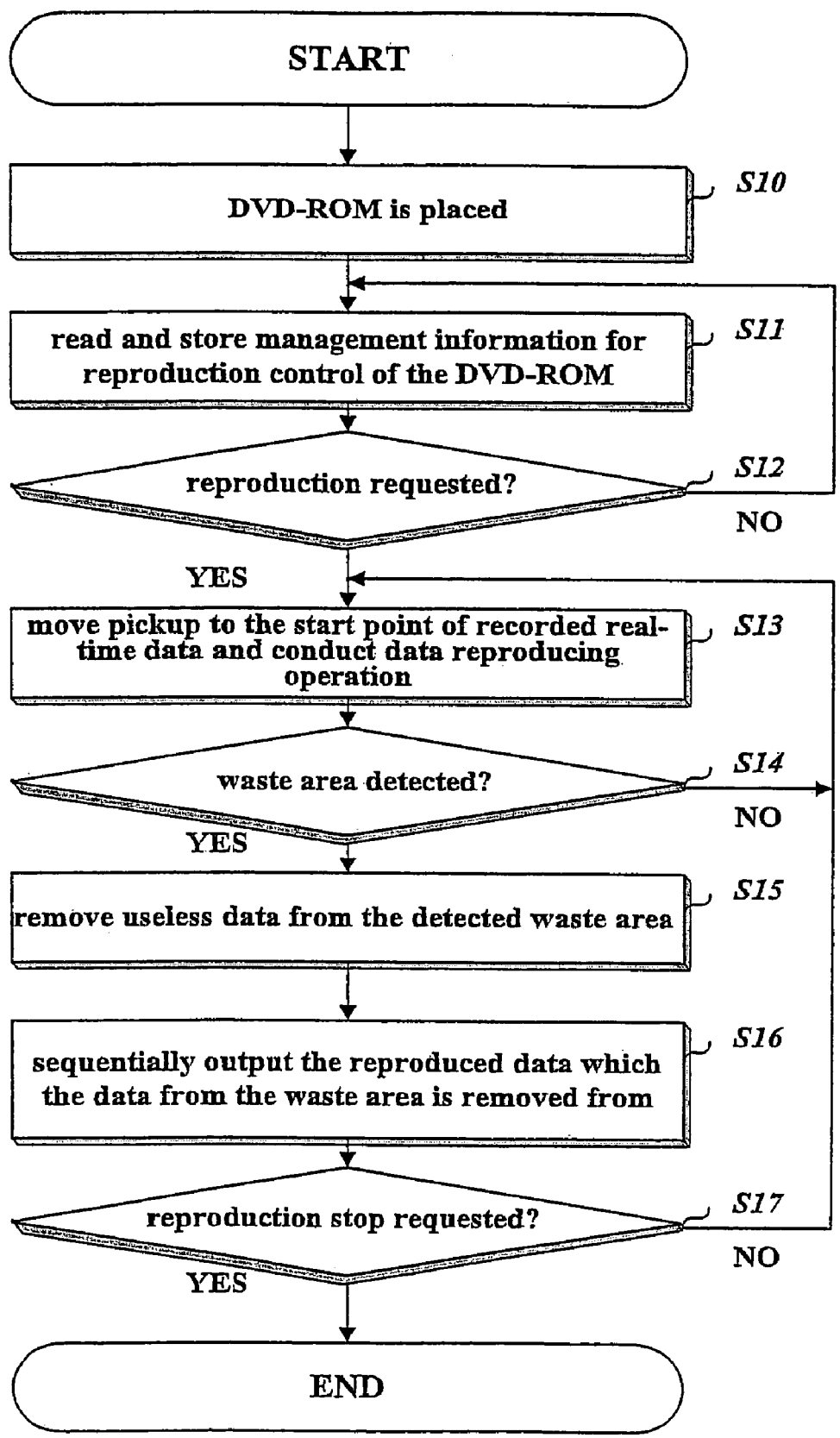
FIG. 5 is a flow chart of an embodiment of a method reproducing a real-only recording medium manufactured in accordance with the present invention.

FIG. 5 is a flow chart of a preferred embodiment of a method reproducing a read-only recording medium manufactured in accordance with the present invention.

When a read only recording medium, namely, the DVD-ROM 1 containing waste areas in its stored data is placed in the disk device of FIG. 4 (S10), the controller 5 searches the placed DVD-ROM 1 for management information recording area first, then, it reads out the management information, such as navigation data for reproduction control of stored data, and stores such information in an internal memory (S11).

Afterwards, if a reproduction of the DVD-ROM 1 is requested from a user, the controller 5 moves the pickup 2 to a start point of stored real-time or other data and conducts data reproducing operation (S13).

While conducting data reproducing operation, the controller 5 checks whether or not a current reproducing position advances into the waste area (S14). For example, if the current reproducing position is at a sector right after a 32-Kbyte ECC block, composed of 16 sectors, that sector is regarded as the waste area. Alternatively, other identifier indicative of the waste area may be used for detecting the waste area.

If the waste area is detected by the controller 5, the useless data from the detected waste area is removed during the next data processing step by the controller 5 (S15). For removing the useless data, the controller 5 stops storing the reproduced data in the buffer 6 when the waste area is encountered, and resumes the storing operation after the waste area has ended. Preferably, the end of the waste area is when the next ECC block begins. Thus, only the recorded data is stored into the buffer 6 without the useless data from the waste area.

If the stored data in the buffer 6 is sequentially outputted in the order the data was stored, the seamless reproduction of the DVD-ROM 1 is achieved (S16). If a reproduction stop is requested from a user afterwards (S17), the controller 6 stops the above seamless reproduction operation.

Through the above-explained reproducing method, the disk device performs a seamless reproduction of a read-only recording medium whose real or actual data is recorded discontinuously because the waste area has been periodically inserted.

If a DVD-RAM or a DVD-RW, in which real data has been recorded discontinuously because of the header information area or the linking loss area, is inserted in the disk device, the controller 5 also conducts the invalid data removing operation in the same manner, namely, it stops storing data from the rewritable recording medium when the header information or the linking loss area is detected, and resumes to store when the header information or the linking loss area ends while outputting the stored data sequentially in storing order. Therefore, it is not needed to distinguish the type of an inserted disk. In other words, the disk device of the preferred embodiment may apply the same reproducing algorithm to all disk types, e.g., a read-only disk DVD-ROM and a rewritable disk DVD-RAM or DVD-RW.

Alternative to the above described data removing operation in which the useless data in the waste area is removed after being reproduced, the waste area may be skipped immediately by track jump without data reproduction when the waste area is encountered.

Furthermore, instead of allocating the waste areas uselessly, it may be possible to form in the waste area useful data, e.g., repetitive 8T-long (T is a bit time interval in a recording wave train) pre-pits which can be used for synchronizing a servo-controlling PLL in later reproduction.

As aforementioned, the substantial storage capacity of the DVD-ROM is reduced below the nominal capacity of 4.7 Gbytes because the waste areas are formed repeatedly every certain data unit, e.g., ECC block. However, the storage shortage due to such capacity reduction will be resolved naturally if a high-density DVD-ROM whose capacity is above about 15 Gbytes is developed in the near future.

The above embodiments for a read-only recording medium were explained in consideration of an existing recording medium, namely, DVD-RAM and DVD-RW. However, if a next generation of a recording medium is developed, it will be natural that a read-only medium of the next generation have the aforementioned waste area of which size is equal to that of an intermediary area inserted periodically in actual user data in a counterpart, namely, a rewritable medium of the next generation.

The read-only recording medium and the reproducing method thereof ensure the reproduction compatibility between a read-only recording medium and a rewritable one and, therefore, make it possible to apply the same reproduction algorithm to both a rewritable and a read-only recording medium. As a result, the playability is improved in a disk device capable of reproducing both a read-only and a rewritable recording medium. In addition, a rewritable recording medium can accommodate entire data stored fully onto a read-only recording medium when a disk copy is requested.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An apparatus for reproducing data recorded on a read-only recording medium, comprising:
   an optical pickup for reading data recorded on the read-only recording medium;
   a signal processor for processing the data to retrieve an original signal; and
   a controller connected to the optical pickup and the signal processor to control a reproduction of data, wherein the controller detects an invalid data area based on an identifier included in the read-only recording medium, and controls at least one of the optical pickup and the signal processor to seamlessly output a valid data unit preceded and followed by the invalid data area detected based on the identifier, wherein the valid data unit comprises an error correction code (ECC) data unit divided into a plurality of sub data units, and a size of the invalid data area is the same as that of a linking area in a writable recording medium.

2. The apparatus of claim 1, further comprising:
   a buffer memory for storing the data read from the optical pickup or processed or to be processed from the signal processor.

3. The apparatus of claim 2, wherein the controller prevents invalid data included in the invalid data area from storing in the buffer memory.

4. The apparatus of claim 1, wherein the controller controls the optical pickup to skip the invalid data area when the identifier is detected.

5. The apparatus of claim 1, wherein the controller controls the signal processor to output valid data included in the valid data unit and not invalid data included in the invalid data area when the identifier is detected.

6. The apparatus of claim 1, wherein the invalid data area includes a servo control information, thereby controlling servo operation in the valid data unit preceded and followed by the invalid data area.

7. A method of reproducing date recorded on a read-only recording medium, comprising the steps of:
   determining whether an identifier is detected, the identifier being used to identify an invalid data area, the invalid data area preceded and followed by a valid data unit;
   controlling a data reproduction process to output valid data included in the valid data unit and not invalid data included in the invalid data area, based on the determining step, wherein the valid data unit comprises an error correction code (ECC) data unit divided into a plurality of sub data units, and a size of the invalid data area is the same as that of a linking area in a writable recording medium; and
   outputting the valid data seamlessly as a result of the controlling step.

8. The method of claim 7, wherein the controlling step controls the data reproduction process such that the invalid data is not stored in a buffer memory, thereby outputting only the valid data of the valid data unit.

9. The method of claim 7, wherein the controlling step controls the data reproduction process such that the invalid data is not read from an optical pickup when the identifier is detected based on the determining step, thereby outputting only the valid data included in the valid data unit.

10. The method of claim 7, wherein the invalid data area further includes a servo control information, the method further comprising:
    controlling servo operation in the valid data unit preceded and followed by the invalid data area.

11. The method of claim 7, wherein the size of the invalid data unit preserves a compatibility with the writable recording medium.

* * * * *